United States Patent Office 3,467,862
Patented Sept. 16, 1969

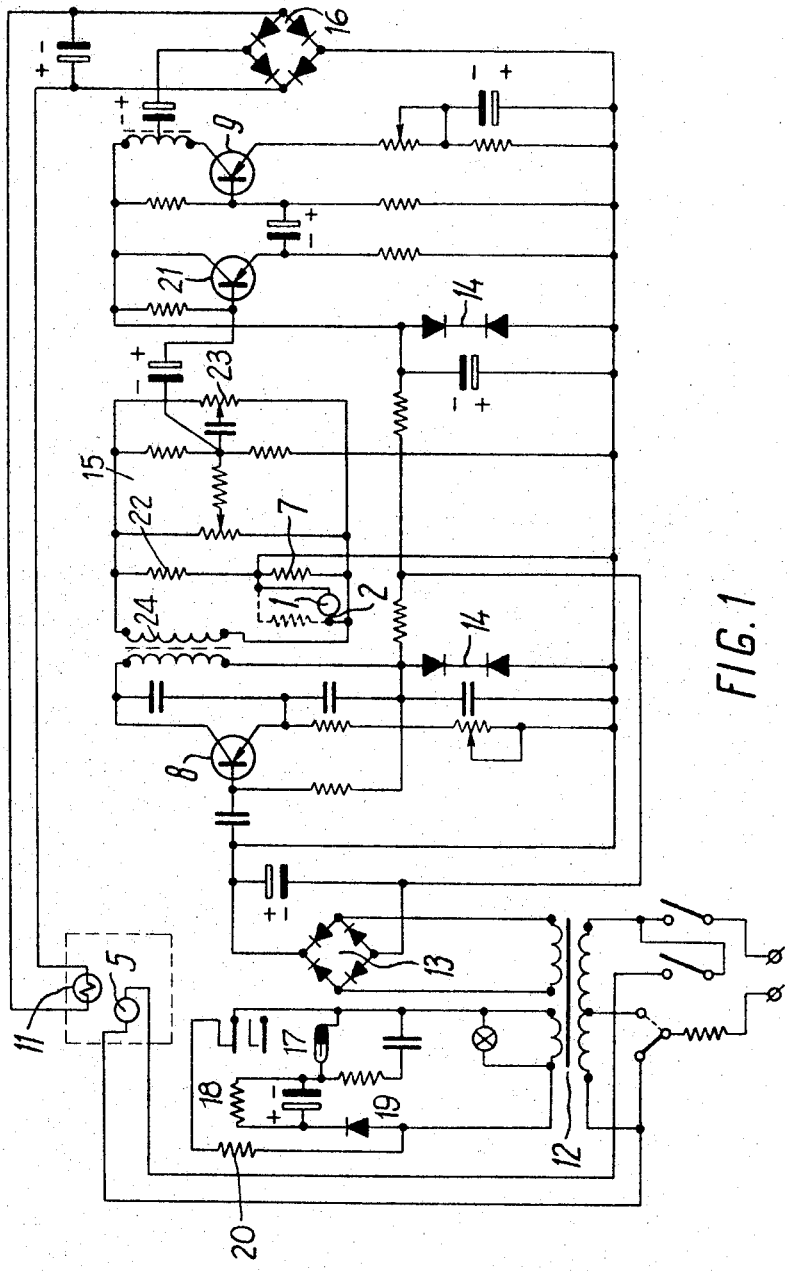

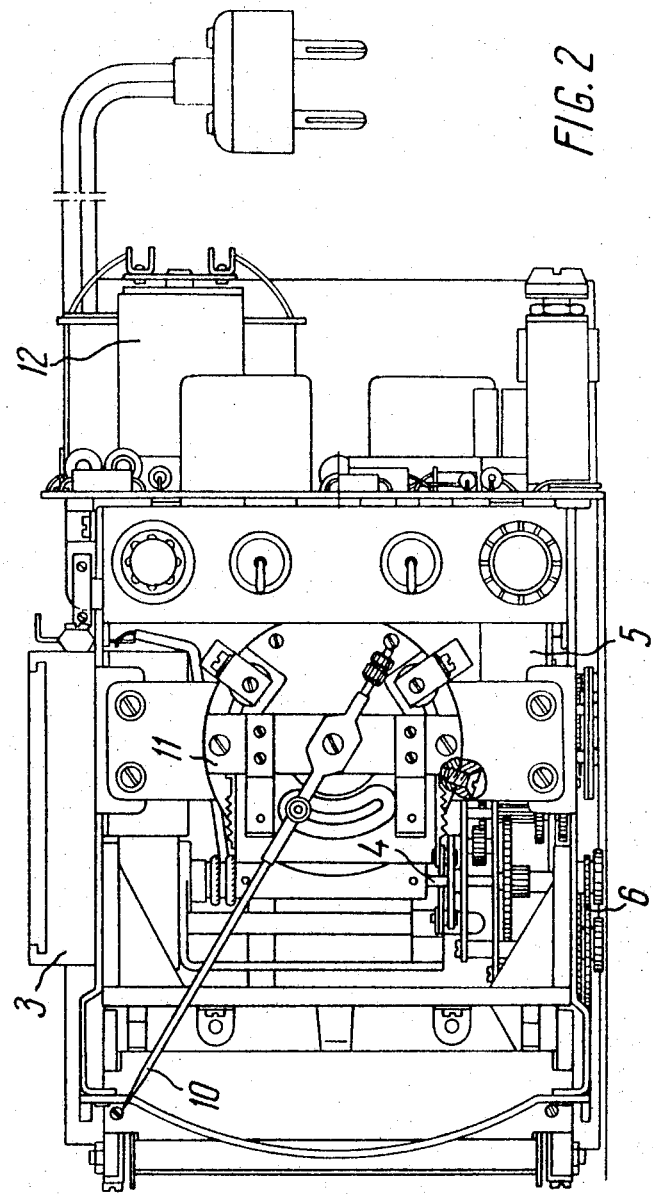

3,467,862
APPARATUS FOR RECORDING RESISTANCE CHANGES DURING THE ENTIRE COAGULATION PROCESS IN A BIOLOGICAL FLUID
Usher Abramovich Vatmakher, Novoizmailovsky pr. 17, kv. 66; Inga Alexandrovna Tolstopyatova, Ulitsa Vernosti 14, korpus 3, kv. 116; Yakov Iosifovich Shvartz, Ulitsa Grazhdanskaya 21, kv. 19; and Tamara Ivanovna Pyankova, Ulitsa Opochinina 29, kv. 35, all of Leningrad, U.S.S.R.
Filed Feb. 20, 1967, Ser. No. 617,353
Int. Cl. G01r 27/02, 27/24
U.S. Cl. 324—65    5 Claims

ABSTRACT OF THE DISCLOSURE

An apparatus for obtaining characteristic curves of the coagulation process in a biological fluid, e.g. blood, wherein the vessel containing the tested fluid and provided with electrodes is placed into a thermostatically controlled chamber and is associated with a crank gear that imparts oscillations to said vessel. A measuring electrical circuit is coupled to the electrodes, said circuit comprising a balanced bridge supplied with an alternating current of, for example, 8 to 12 kc./s., one of the arms of the bridge being coupled to said electrodes and the output thereof being coupled through an amplifier and a detector to a recorder means. The apparatus insures continuous time measuring and recording of the resistance of the tested fluid and variations in this resistance, said tested fluid being not subject to electrolysis during the procedure.

---

This invention relates to apparatus for performing coagulation tests of biological fluids, e.g. blood, with graphical recording of the characteristic curves thereof.

Some methods are known for determining the duration of a coagulation process, e.g. a drop test method. These methods, however, do not facilitate investigating the dynamics of the process in time.

Devices are also known for graphical recording of coagulation versus time, the so-called thrombo-elastographs, wherein provision is made for a mechanism capable of imparting oscillating motion to the vessel containing the sample of the biological fluid under test. The latter apparatus, however, are much complicated in design and unwieldy in construction, as well as sensitive to vibration, which features substantially impede wide application of thromboelastographs in medical practice.

It is known to use at present another apparatus of a similar application whose function is based upon the principle of imparting periodic oscillations through an angle of about 90° to a container within which is a blood sample to be tested. In this apparatus, the electrodes or probes, which are supported in the container stopper and series-connected with a mercury switch which is mounted together with the container on the gear mechanism shaft, are associated with the meter. As the container is tilted to one side, so that the blood under test closes the electrodes in the container, the electrodes of the mercury switch are isolated from each other and the electrical circuit is thus opened. When the container is tilted to the other side, the contacts of the mercury switch are connected whereas the electrodes in the container are isolated, the circuit likewise being opened. Thus, in the last-mentioned apparatus, the circuit remains open until a clot forms in the biological fluid or blood on the container electrodes.

The apparatus described above has also not been widely used since the application of the mercury switch fixed together with the container on a common shaft and connected in series with the electrodes thereof offers no possibility for determining the coagulating properties of the biological fluid or blood under test, apparatus being capable of determining only the duration of the clot formation process.

Apart from this, the utilization of a direct or alternating current of commercial frequency for making measurements in the apparatus results in inevitable polarization of the electrodes thereof. Furthermore, the application of the mercury switch is constructionally intricate and involves difficulties in servicing the apparatus.

It is an object of the present invention to provide an apparatus simple in construction and insuring accurate and high-quality investigation of the entire process of coagulation of blood or other biological fluid.

According to the invention, said object is accomplished with apparatus in which an oscillating vessel containing the fluid to be tested is provided with electrodes and is placed into a thermostatically controlled chamber. Connected to the electrodes is a measuring circuit, comprising a balanced bridge supplied with an A.C. current whose frequency is above that of the line supply (e.g. 8 to 12 kc./s.), one of the arms of said bridge being connected with said electrodes and the output thereof being connected through an amplifier and a detector to a recorder means.

Such a design of the apparatus makes it possible to effect continuous time measuring and recording of the resistance of the fluid under test, as well as variations of said resistance, and not only the time the clot is formed, the further advantages being obtained that the fluid is not subject to electrolysis and polarization of the electrodes is avoided.

There next follows a detailed description of the present invention, to be considered in conjunction with the accompanying drawings wherein:

FIG. 1 is an electrical circuit diagram of the apparatus of the invention; and

FIG. 2 is a general diagrammatic view of the apparatus.

The apparatus of the invention comprises a thermostatically controlled chamber 3 (FIG. 2) into which a vessel 1 (FIG. 1) containing the biological fluid to be tested is placed. The temperature in the chamber 3 is stabilized by means of an electrical heater 20, controlled by a thermal contactor 17 through a relay 18. The relay 18 is fed by a transformer 12 through a rectifier 13.

The vessel 1 is oscillated by a crank gear 4 driven by a motor 5. Built into the bottom of the vessel 1 are two electrodes 2 which are connected to arm 7 of a balanced electrical bridge 15 supplied with, for example, a 10 kc./s. A.C. voltage from a generator 8 through a transformer 24. The bridge 15 is balanced by the active component with the help of a regulator 22, and by the reactive or imaginary component with the help of a regulator 23.

The output of the A.C. bridge 15 is connected to a recorder means 11 through a matching network (an emitter follower) 21, an amplifier 9 and a detector 16.

The paper tape in the recorder means 11 is transported by means of the motor 5. The electrical circuit of the recorder means is powered by the transformer 12 through the rectifier 13 and a stabilizer 14.

The biological fluid to be tested is poured into the vessel 1 which is closed with a cover and placed into the thermostatically controlled chamber 3 (i.e., a temperature controlled chamber). By means of the crank gear 4 driven by the motor 5, the vessel 1 is oscillated in such a manner that the tested fluid alternately opens and closes the electrode circuit by flowing around and away from the electrodes. When the electrodes are opened, the resistance across them becomes infinitely great.

In the course of coagulation, the travel of the tested fluid within the vessel becomes impeded, the electrical circuit of the electrodes ceases to be broken, and the value of the resistance between the electrodes becomes finite.

With a lapse of time, the extent of variation of the inter-electrode resistance becomes smaller in accordance with the dynamics of the coagulation process.

Due to the fact that the bridge 15 and, hence, the electrodes of the vessel 1 are supplied with alternating current whose frequency is higher than the line voltage frequency, the electrolysis of the fluid under test and polarization of the electrodes are precluded.

At the moment the electrodes are closed by the tested fluid, the bridge 15 becomes unbalanced, which results in the appearance of signals at the bridge output and, hence, at the output of the recorder means 11. The signals transformed by the measuring circuit are recorded on the paper tape which moves at a constant speed.

The time recording of the test results characterizes the entire coagulation process and has the form of a sequence of pulses, the frequency and amplitude thereof corresponding to the resistance of the tested fluid at the moment of closure of the electrodes.

The apparatus of the present invention is applicable for investigating coagulation of blood and other biological fluids in minute quantities, this being instrumental for investigating, for example, the coagulation not only of venous blood, but also of capillary blood taken from a patient's finger.

What is claimed is:

1. An apparatus for obtaining characteristic curves of a coagulation process in a biological fluid, said apparatus comprising a temperature controlled chamber; a vessel in said chamber and adapted to accommodate a fluid to be tested; two electrodes in said vessel and adapted to measure the resistance of the fluid; a measuring electrical circuit comprising a measuring balanced bridge adapted for operating with an alternating current voltage, said bridge including a plurality of arms, said electrodes being connected to one of said arms, the bridge being adapted to become unbalanced when the electrodes are coupled through the said fluid, whereby the bridge produces an output voltage having the same frequency basis as said alternating current voltage and the amplitude of which depends on the resistance of the fluid coupling said electrodes; means for imparting oscillatory motions to said vessel in such a manner that the fluid to be tested alternately closes and opens said electrical circuit by flowing around and away from the electrodes, respectively; an A.C. generator supplying said bridge with said alternating-current voltage; an amplifier to amplify the output voltage of the bridge when the latter is unbalanced; a detector to convert the amplified voltage into a direct-current voltage; and registering means connected to said detector to record the thusly converted voltage.

2. Apparatus as claimed in claim 1 comprising line voltage supply means supplying alternating-current power to said registering means, the frequency of said alternating-current voltage being higher than that of the alternating-current power.

3. Apparatus as claimed in claim 2 comprising temperature control means operatively associated with said chamber and supplied with power by said line voltage supply means.

4. Apparatus as claimed in claim 1, wherein the A.C. generator is a solid state oscillator.

5. Apparatus as claimed in claim 4 comprising an impedance matching network between said bridge and detector.

References Cited
UNITED STATES PATENTS

| | | | |
|---|---|---|---|
| 2,555,937 | 6/1951 | Rosenthal et al. | 324—30 |
| 2,769,141 | 10/1956 | Richardson | 324—30 |
| 3,020,748 | 2/1962 | Marshall et al. | 324—30 |

EDWARD E. KUBASIEWICZ, Primary Examiner

U.S. Cl. X.R.

324—30